3,515,578
PRESSURE-SENSITIVE-ADHESIVE TAPE
Jun Tomita and Thomas W. Strahan, St. Paul, Minn., assignors to Minnesota Mining and Manufacturing Company, St. Paul, Minn., a corporation of Delaware
No Drawing. Continuation-in-part of abandoned application Ser. No. 513,538, Dec. 13, 1965. This application Mar. 14, 1969, Ser. No. 807,442
Int. Cl. C09j 7/02; C09d 5/18
U.S. Cl. 117—122                    10 Claims

ABSTRACT OF THE DISCLOSURE

Flame-retardant pressure-sensitive adhesives and tapes are disclosed. The adhesives comprise a pressure-sensitive-adhesive polyacrylate polymer modified with a tris-(halogenated alkyl) phosphate; preferred adhesives also include antimony oxide.

RELATED APPLICATION

This application is a continuation-in-part of copending application, Ser. No. 513,538, filed Dec. 13, 1965, and now abandoned.

BACKGROUND OF THE INVENTION

The excellent pressure-sensitive-adhesive properties of certain polyacrylates, together with their good high-temperature properties, good thermal- and chemical-stability, and good oil- and solvent-resistance, have made their use inelectrically insulative tapes especially advantageous. But polyacrylates are also flammable, and, as a result, electrically insulative tapes using acrylate-based pressure-sensitive-adhesives have tended to support a flame begun in them. Despite the desire that electrically insulative pressure-sensitive-adhesive tapes be as incombustible as possible, no one has been able to make pressure-sensitive-adhesive polyacrylates flame-retardant while maintaining their desired adhesive properties.

Making a pressure-sensitive-adhesive polyacrylate flame-retardant is not simply a question of adding any flame-retardant additive to the polyacrylate. Pressure-sensitive adhesives are unusual materials having a balance of adhesive, cohesive, elongation, and elastic properties. This balance is such that they will adhere a tape backing to a variety of dissimilar surfaces with mere finger- or hand-pressure and yet permit the tape to be handled with the fingers and removed from a smooth surface without leaving a residue. The addition of many modifying materials to a base pressure-sensitive-adhesive material often disrupts the necessary balance of properties so that the material is no longer satisfactory as a pressure-sensitive-adhesive. For example, the addition to pressure-sensitive-adhesive polyacrylates of such ordinarily useful flame-retardant additives as tricresyl phosphate and tributyl phosphate greatly weakens the cohesive properties of the resultant product and as a result, a satisfactory polyacrylate adhesive cannot be formed with these additives.

Other materials that have conventionally been useful as flame-retardant additives, such as chlorinated polyphenyls and chlorinated paraffins, offer hardly any decrease in the flammability of polyacrylates; further, the chlorinated paraffins release chlorine atoms so easily that a chlorinated-paraffin-loaded polyacrylate adhesive would corrode many surfaces on which an electrically insulative tape must be wrapped. Other traditional flame-retardant additives that have been tried and found to provide an inadequate reduction in the flammability of pressure-sensitive-adhesive acrylates are triphenyl phosphorous, poly-β-chloroethyl triphosphonate, and a medium-viscosity, hydroxyl- and chlorine-containing polyphosphate ester (Pyrostop E–100).

SUMMARY OF THE INVENTION

The present invention provides pressure-sensitive-adhesive polyacrylates that are modified to be sufficiently flame-retardant so as to extinguish any flame begun in them, but that yet retain excellent pressure-sensitive-adhesive properties. These polyacrylates are modified by the addition for each 100 parts of polyacrylate of between 5 and 60 parts by weight of certain tris-(halogenated alkyl) phosphates—specifically those tris-(halogenated alkyl) phosphates in which the alkyl group contains at least three carbon atoms and in which at least two halogen atoms are attached to each alkyl group. These described tris-(halogenated alkyl) phosphates provide a useful degree of flame-retardancy and do not destroy the adhesive and other physical properties of the resultant product. Of the described class, those tris-(halogenated alkyl) phosphates in which at least one of the halogen atoms in each alkyl group is bromine are preferred, and those in which both of the halogen atoms are bromine are even more strongly preferred. This preference can be illustrated by the following test results measuring the cohesive strength of several samples of a representative pressure-sensitive-adhesive polyacrylate (a copolymer of 97 weight-percent methyl isoamyl acrylate and 3 weight-percent acrylic acid crosslinked through the carboxyl groups with an aziridine crosslinking agent), each sample being modified by the addition of 30 parts of a different one of the following flame-retardant additives:

| Sample | Additive | Cohesive strength [1] (min.) |
|---|---|---|
| A | Tris-(B-chloroethyl) phosphate | 3 3 |
| B | Tris-(2,3-dichloropropyl) phosphate | 10.7 |
| C | Tris-(1,3-dichloropropyl) phosphate | 10.5 |
| D | Tris-(1-bromo-3-chloroisopropyl) phosphate | 18.8 |
| E | Tris-(2,3 dibromopropyl) phosphate | >1,100 |

[1] Two one-half-inch-wide strips of 3-mil polyethylene terephthalate film coated with the adhesive material being tested are arranged in longitudinal alignment with their adhesive surfaces together and with only a one-half-inch-length of one end of each of them overlapped; the overlapped end portions of the two strips are pressed together by rolling with a weighted roll in a typical manner. The assembly is then suspended by a hook attached to the free end of one of the strips, and a 1000-gram weight is suspended from a hook attached to the free end of the other strip to apply a shearing force to the adhesive bond. The time for the bond between the two strips to fail at room conditions, by complete separation of the tapes and falling of the weight, is a measure of the cohesive strength of the base adhesive material.

The cohesive strength of a useful pressure-sensitive-adhesive is at least 10 minutes in the described test, preferably at least 15 minutes, and even more preferably 60 minutes. As will be seen, the A adhesive is clearly unsatisfactory; the B and C adhesives are marginal adhesives useful for selected applications; the D adhesive is a generally satisfactory adhesive; and only the E adhesive has excellent properties.

In addition to a tris-(halogenated alkyl) phosphate, the modified polyacrylate adhesives of the present invention preferably include between about 2 and 30 weight-parts of antimony trioxide per 100 weight-parts of the polyacrylate. The antimony trioxide acts synergistically with the tris-(halogenated alkyl) phosphate in a pressure-sensitive-adhesive acrylate to increase flame-resistance.

DETAILED DESCRIPTION

In general, the base polyacrylate in an adhesive of the invention is selected from homopolymers of, or copolymers which principally include, acrylates of nontertiary alkyl alcohols. The alkyl chains in the acrylate monomers generally have between about 1 and 14 carbon atoms per molecule, usually between 4 and 12 carbon atoms per molecule. A mixture of different acrylate monomers may be included, but at least a major portion of the alcohol residues forming the alkyl tails of the molecules should have carbon-to-carbon chains of at least four carbon atoms terminating at the ester linkages. Examples of useful pressure-sensitive-adhesive polyacrylates are homopolymers and copolymers of methyl isoamylacrylate, isooctyl acrylate, commercial fusel oil acrylate (in which 55–80 percent of the acrylates are esters of primary amyl alcohols, 15–45 percent are esters of primary butyl alcohol, and 0–5 percent are esters of n-propyl alcohol), and 2-ethyl hexylacrylate; such other monomers as acrylic acid, methacrylic acid, acrylamide, methacrylamide, acrylonitrile, and methacrylonitrile may be included in minor amount in the copolymers.

The best flame-retardancy is produced with rather large amounts of the tris-(halogenated alkyl) phosphate, preferably at least 20 weight-parts per 100 weight-parts of polyacrylate. Surprisingly, quite large amounts—up to about 60 weight-parts per 100 weight-parts of the acrylate polymer—of these liquid materials, especially tris-(2,3-dibromopropyl) phosphate, can be included without rendering the adhesive unduly soft or harming its high-temperature adhesive properties, thermal- or chemical-stability, or insulating properties; the best overall adhesive properties are obtained, however, when less than 40 weight-parts are used per 100 weight-parts of the acrylate polymer. If desired, the adhesive may be made firmer by the use of acrylate polymers having a reactive group, such as a carboxyl group, which permit the polymer to be crosslinked with a crosslinking agent such as a peroxide or aziridine compound. A preferred amount of crosslinking agent is 0.1 to 5 parts per 100 parts of acrylate polymer.

The antimony trioxide may be added in the form of a rather pure powder; or it may be added as a coating on silica particles, in which case it comprises about 50 weight-percent of the total particulate added. A preferred amount of antimony trioxide is 2 to 20 weight-parts per 100 weight-parts of acrylate polymer. Some care is required to assure that the antimony trioxide is well dispersed in the adhesive. We have found that milling all or a portion of the adhesive ingredients, including the antimony trioxide, in a ball or paint mill works well.

In the formation of tapes, these new flame-retardant, self-extinguishing adhesives can be applied to a wide variety of backings. Preferably, the backing itself is as flame-retardant as the tape adhesive, but not necessarily. Preferred backings for electrically insulative tapes are those which are themselves electrically insulative, as for example those composed of flexible films based on homo- and copolymers of vinyl chloride. These may be plasticized and may contain flame-retarding additives. With certain varieties of plasticized polyvinyl chloride backings, it may be essential to use tris-(halogenated alkyl) phosphates which have two bromine atoms on each alkyl group as the additive. As previously noted, adhesives with these additives have the best cohesive strength, and they retain quite useful adhesive properties even if some of the plasticizer in the plasticized polyvinyl chloride backing migrates to the adhesive. Other useful backings for tapes of the invention include glass cloths; fluorocarbon-based films such as polytetrafluoroethylene and polytrifluorochloroethylene films; flexible epoxy-polyester films such as described in U.S. Pat. 3,027,279 to Kurka et al.; resin-impregnated non-woven or woven webs; and other materials.

The invention is further illustrated in the following examples. In these examples, flammability tests were run on vertical free-hanging strips of adhesive-coated material in a draft-free atmosphere. In some cases the test strips were ¾-inch-wide, 12-inch-long strips of 7.5-mil plasticized polyvinyl chloride film, and in other cases they were ¾-inch-wide, 9-inch-long strips of glass cloth. The plasticized polyvinyl chloride films were self-extinguishing and the glass cloth was non-combustible. The test strips of material were ignited through the use of a ½-inch by 1-inch strip of cellophane tape adhered to the bottom of the test strip, and the cellophane tape was ignited with a small flame from a Bunsen burner. The flammability of the adhesive was measured in some cases by noting the average burning rate in inches per second and in other cases by noting the time that elapsed after the Bunsen burner was removed before the flame went out. The specimens were considered to be self-extinguishing if the flame went out before burning the whole length of the tape. The averages in the examples following are based on a minimum number of 5 test specimens. In all instances the tapes of the examples could be wound in roll form following the usual procedure for making tapes of acrylate-adhesive-coated backings. If not stated, all parts and percents in the example are by weight.

Example 1

An adhesive was prepared according to the following formulation:

| | Parts by weight |
|---|---|
| Copolymer including 97 parts methyl isoamylacrylate and 3 parts acrylic acid | 100 |
| Tris-(2,3-dibromopropyl) phosphate (Firemaster T23P) | 35 |
| Antimony trioxide | 5 |
| Carbon black (Carbolac No. 2) | 1.25 |
| 50-percent-solids dispersion of 2,4-dichlorobenzoyl peroxide in dibutyl phthalate | 2 |

A portion of the copolymer was dispersed in a mixed heptane-ethyl acetate solvent and milled in a ball mill with the antimony trioxide and the carbon black, and the resulting mixture is then added to the remainder of the copolymer. The peroxide dispersion, predissolved in toluene, was then added to the mixture to give a final adhesive mixture which had a solids content of 35 weight-percent. A control adhesive was prepared using the copolymer and peroxide but not the phosphate, antimony trioxide, or carbon black.

Both the flame retardant adhesive and the control adhesive were coated on 7.5-mil plasticized polyvinyl chloride film using a knife-coater set with an 8-mil orifice. The polyvinyl chloride film had been primed with a primer composed of a mixture of a nitrile rubber, a bisphenol-A type liquid epoxy resin, and a polyamide resin (General Mills "Versamid 115") from a 5% solution, as described in U.S. Pat. No. 2,925,174. The coated strips of tape were dried 5 minutes at 200° F. and then heated 3 minutes at 230° F. to activate the peroxide and cure the adhesive. The resulting product was then slit into tape strips ¾-inch wide and 12-inches long. The flammability tests gave the following results:

| | Average flameout time, seconds | Range of flameout times, seconds | Percent of samples self-extinguishing | Type of burning |
|---|---|---|---|---|
| Control adhesive | 17 | 10–27 | 50 | Large flame on both sides of tape. |
| Flame-retardant adhesive | 5 | 4–7 | 100 | Small flame at edges of tape. |

The adhesive, electrical, and other properties of the tapes are given in the following table:

|  | Adhesion, oz./in. | Adhesion to backing, oz./in. | Adhesive anchorage, oz./½ in. | Insulation resistance, megohms | Copper corrosion test [1] | Dielectric constant [2] | Dissipation factor [2] |
|---|---|---|---|---|---|---|---|
| Control adhesive | 14 | 23 | 82 | 10⁶ | [3] | 5.3 | 0.08 |
| Flame-retardant adhesive | 13 | 20 | 80 | 10⁶ | [3] | 6.0 | 0.07 |

[1] In the copper corrosion test a tape sample with its adhesive adhered to copper foil is exposed for 5 days at 210° F. and 100 percent relative humidity.
[2] Dielectric constant and dissipation factor were measured at 23° C. and 100 cycles/second. Samples were conditioned 24 hours prior to testing at 50 percent relative humidity and 23° C.
[3] No corrosion.

Example 2

An adhesive was prepared according to the following formulation:

| | Parts by weight |
|---|---|
| Copolymer including 96 parts isooctyl acrylate and 4 parts acrylamide | 100 |
| Tris-(2,3-dibromopropyl) phosphate (Firemaster T-23P) | 35 |
| Antimony oxide (Oncor 23A) | 2.5 |
| Carbon black (Carbolac No. 2) | 1.25 |

This adhesive was mixed in the manner of the adhesive material in Example 1 and then coated onto 7.5-mil, ¾-inch-wide, 12-inch-long strips of plasticized polyvinyl chloride primed on one side as in Example 1. A control adhesive that included just the copolymer was coated on an identical film. The adhesive was coated using a knife-coater set with an 8-mil orifice, and these coated strips were dried for 3 minutes at 150° F. and for 3 minutes at 200° F. Flammability tests were then performed on the flame-retardant and control strips with the following results:

|  | Average flameout time, seconds | Range of flameout times, seconds | Percent of samples self-extinguishing | Type of burning |
|---|---|---|---|---|
| Control adhesive. | 19 | 11–27 | 80 | Adhesive side, medium to large flame. |
| Flame-retardant adhesive. | 5 | 4–7 | 100 | Small flame at edge of tape, adhesive side. |

Adhesion properties were measured for both the control and flame-retardant tapes and were found to be substantially equivalent.

Examples 3 and 4

The methyl isomylacrylate-acrylic acid copolymer of Example 1 in the amount 100 weight-parts was mixed with 20 weight-parts of the flame-retardant material shown in the table below and the mixture then adjusted to 30-percent solids with heptane. The different mixtures were knife-coated onto thin, flexible, 4-mil-thick, ¾-inch-wide, 9-inch-long strips of glass cloth backings (Hess Goldsmith Style HG–16), with the coating orifice set at 10 mils; the coated backings were then dried 15 minutes at 150° F. The burning rates of these glass-cloth tapes were compared to the burning rate for a glass-cloth tape coated with just the copolymer.

| Composition of flame-retardant additive | Example 3.—Tris-(2,3-dichloropropyl) phosphate (Celluflex FR-2) | Example 4.—Tris-(2,3-dibromopropyl) phosphate (Firemaster T-23P) |
|---|---|---|
| Burning rate, inches/second: | | |
| Control | 0.95 | 0.98 |
| Flame-retardant adhesive | 0.60 | .67 |
| Percent decrease in rate | 37 | 32 |

In all the cases the modified adhesives retained excellent adhesive and internal strength properties as compared to the control adhesive.

A further decrease in the burning rate is realized by incorporating a small amount of antimony oxide as indicated in the following examples.

Example 5

The flame-retardant adhesive and conntrol adhesive of Example 1 were coated on the glass-cloth backing of Examples 3 and 4. The coated glass cloth was dried at 150° F. and then heated at 250° F. for 5 minutes to activate the peroxide and cure the adhesive. Flammability tests were performed on ¾-inch-wide, 9-inch-long strips of the resulting tape with the following results:

|  | Average burning rate, inches/second | Percent of samples self-extinguishing |
|---|---|---|
| Control adhesive | 1.06 | 0 |
| Flame-retardant adhesive | 0.55 | 100 |

In this case the decrease in the burning rate of the type coated with flame-retardant adhesive was about 48 percent, and this tape was 100% self-extinguishing.

Example 6

A flexibile epoxy-polyester flame-retardant resin was formulated from a carboxyl-terminated polyester, an epoxy resin made from brominated bisphenol A, anyhydride hardener and tertiary amine catalyst in accordance with Example 8 of U.S. Pat. 3,027,279. A film was prepared from a solution of this material by casting onto a carrier web, drying and curing. This film was completely self-extinguishing, but when it was converted into a tape by coating with a pressure-sensitive adhesive polyacrylate—poly (methylisoamylacrylate)—the resulting tape was flammable due to the flammability of the acrylate adhesive. When this same adhesive was modified as follows:

| | Parts |
|---|---|
| Poly (methylisoamylacrylate) | 100 |
| Tris-(2,3-dibromopropyl) phosphate | 35 |
| Antimony trioxide coated silica particles (50% by weight antimony oxide) | 5 |
| Carbon black | 1.25 | the tape coated with this adhesive was self-extinguishring.
Results were as follows:

|  | Average flameout time, sec. | Range of flameout times, sec. | Percent self-extinguishing | Adhesion to steel, oz./inch |
|---|---|---|---|---|
| Control | Completely burned up | | 0 | 44 |
| Flame-retardant adhesive | 7.5 | 7–8 | 100 | 36 |

What is claimed is:
1. A flame-retardant pressure-sensitive-adhesive tape comprising (1) a flexible backing and (2) firmly united to one side of the backing a pressure-sensitive adhesive that includes (a) 100 parts of a normally tacky cohesive stretchable and elastic polymeric material selected from homopolymers of, and copolymers which principally include, acrylates of nontertiary alkyl alcohols and (b) between about 5 and 60 parts of a tris-(halogenated alkyl) phosphate having at least 3 carbon atoms in each alkyl group and at least two halogen atoms on each alkyl group.

2. A tape of claim 1 in which the pressure-sensitive adhesive also includes between about 2 and 30 parts of antimony trioxide.

3. A tape of claim 1 in which the pressure-sensitive adhesive includes between about 20 and 40 parts of a tris-(halogenated alkyl) phosphate and between about 2 and 20 parts of antimony trioxide.

4. A tape of claim 1 in which the tris-(halogenated alkyl) phosphate has at least one bromine atom on each alkyl group.

5. A tape of claim 1 in which the tris-(halogenated alkyl) phosphate has at least two bromine atoms on each alkyl group.

6. A tape of claim 1 in which the acrylate polymer includes reactive groups, and the polymer is crosslinked with an agent that reacts with the reactive groups.

7. A tape of claim 1 in which the backing is polyvinyl chloride of low combustibility.

8. A tape of claim 7 in which the tris-(halogenated alkyl) phosphate has at least two bromine atoms on each alkyl group.

9. A tape of claim 8 in which the adhesive further includes between about 2 and 20 parts of antimony trioxide.

10. A tape of claim 1 in which the backing is a relatively incombustible flexible epoxy-based backing.

References Cited

UNITED STATES PATENTS

| | | | |
|---|---|---|---|
| 2,662,834 | 12/1953 | Paist et al. | 117—136 |
| 2,892,808 | 6/1959 | Shafer | 117—137 |
| 2,953,475 | 9/1960 | Bergstedt et al. | 117—122 |
| 3,336,153 | 8/1967 | Juda | 117—122 X |
| 3,027,337 | 3/1962 | Tritsch | 117—122 X |

WILLIAM D. MARTIN, Primary Examiner

B. D. PIANALTO, Assistant Examiner

U.S. Cl. X.R.

117—136, 137, 138.8; 260—45.75